United States Patent
Pavlovsky et al.

(10) Patent No.: US 10,046,660 B2
(45) Date of Patent: Aug. 14, 2018

(54) DEVICES, SYSTEMS, AND METHODS USING REACTIVE POWER INJECTION FOR ACTIVE TUNING ELECTRIC VEHICLE CHARGING SYSTEMS

(71) Applicant: QUALCOMM Incorporated, San Diego, CA (US)

(72) Inventors: Martin Pavlovsky, Munich (DE); Felix Weidner, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 15/184,877

(22) Filed: Jun. 16, 2016

(65) Prior Publication Data

US 2016/0368387 A1   Dec. 22, 2016

Related U.S. Application Data

(60) Provisional application No. 62/181,971, filed on Jun. 19, 2015.

(51) Int. Cl.
*B60L 11/18* (2006.01)
*H02J 50/12* (2016.01)
(Continued)

(52) U.S. Cl.
CPC ......... *B60L 11/182* (2013.01); *B60L 11/1811* (2013.01); *H02J 7/025* (2013.01);
(Continued)

(58) Field of Classification Search
CPC ..... B60L 11/182; B60L 11/1811; H02J 50/12; H02J 50/90; H02J 50/80; H02J 50/60;
(Continued)

(56) References Cited

U.S. PATENT DOCUMENTS

| 2011/0080056 A1 | 4/2011 | Low et al. |
| 2013/0039099 A1 | 2/2013 | Wu et al. |

(Continued)

FOREIGN PATENT DOCUMENTS

| CN | 203607929 U | 5/2014 |
| CN | 204316199 U | 5/2015 |

OTHER PUBLICATIONS

Huang C-Y., et al., "LCL Pick-Up Circulating Current Controller for Inductive Power Transfer Systems", Energy Conversion Congress and Exposition (ECCE), IEEE, Piscataway, NJ, USA, Sep. 12, 2010 (Sep. 12, 2010), pp. 640-646, XP031787167, ISBN: 978-1-4244-5286-6.

(Continued)

*Primary Examiner* — Robert Deberadinis
(74) *Attorney, Agent, or Firm* — Knobbe, Martens, Olson & Bear, LLP

(57) ABSTRACT

Systems, methods, and apparatus are disclosed for wirelessly charging an electric vehicle. In one aspect, a method for transferring power via a magnetic field in a wireless power transfer system is provided. The method includes outputting an alternating electric current to a wireless power transmitter, generating, at the wireless power transmitter, the magnetic field in response to being driven with the alternating electrical current, receiving a value indicative of an electrical characteristic of the wireless power transmitter, and adjusting an operating characteristic of the wireless power transmitter to trigger a change in an electrical current in the receiver, the amount of adjustment selected to cause adjustment of an amount of reactive power in the wireless power transfer system based on changes in the receiver that automatically occur to maintain the output power substantially constant in response to the change in the electrical current in the receiver.

30 Claims, 11 Drawing Sheets

(51) Int. Cl.
   *H02J 50/80* (2016.01)
   *H02J 7/02* (2016.01)
   *H02J 7/04* (2006.01)
   H02J 50/90 (2016.01)
   H02J 50/60 (2016.01)

(52) U.S. Cl.
   CPC .............. *H02J 7/045* (2013.01); *H02J 50/12* (2016.02); *H02J 50/80* (2016.02); H02J 50/60 (2016.02); H02J 50/90 (2016.02); Y02T 10/7005 (2013.01); Y02T 10/7072 (2013.01); Y02T 90/122 (2013.01); Y02T 90/14 (2013.01)

(58) Field of Classification Search
   CPC ....... H02J 7/025; H02J 7/045; Y02T 10/7005; Y02T 10/7072; Y02T 90/14; Y02T 90/122
   See application file for complete search history.

(56) References Cited

U.S. PATENT DOCUMENTS

| | | |
|---|---|---|
| 2014/0028110 A1 | 1/2014 | Petersen et al. |
| 2014/0054971 A1 | 2/2014 | Kissin et al. |
| 2014/0203659 A1 | 7/2014 | Madawala et al. |

OTHER PUBLICATIONS

International Search Report and Written Opinion—PCT/US2016/038106—ISA/EPO—dated Sep. 16, 2016.
Miller J.M., et al., "Primary-Side Power Flow Control of Wireless Power Transfer for Electric Vehicle Charging", Journal of Emerging and Selected Topics in Power Electronics, IEEE, Piscataway, NJ, USA, Mar. 1, 2015 (Mar. 1, 2015), pp. 147-162, XP011571721, ISSN : 2168-6777 [retrieved on Jan. 29, 2015].

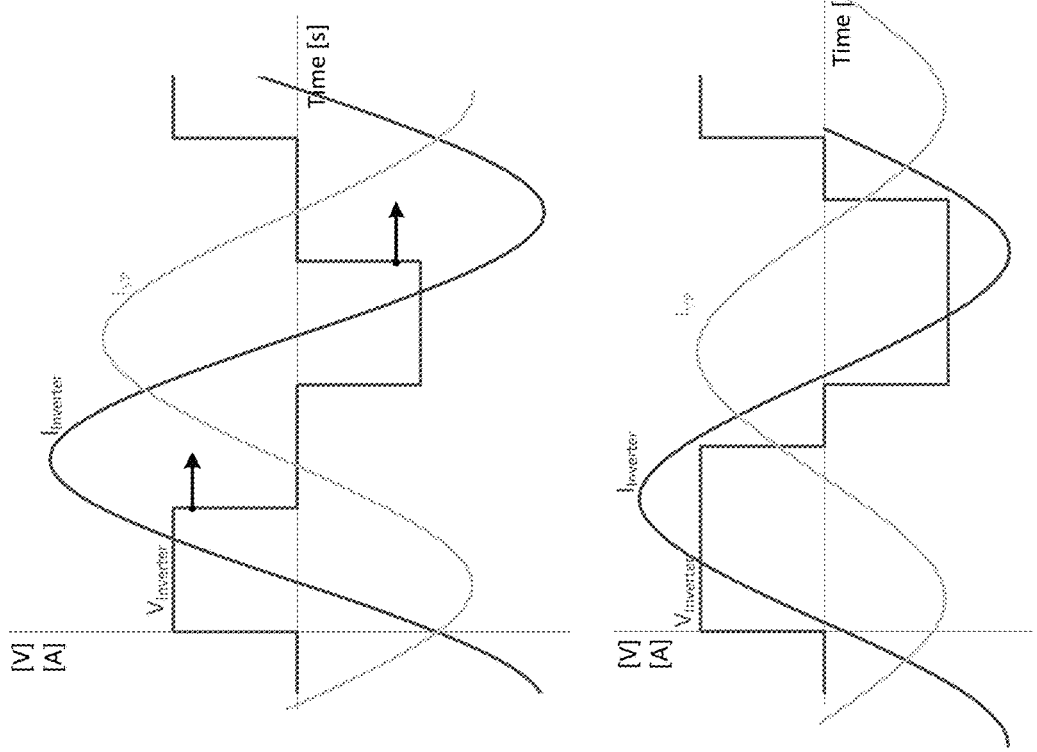

DEVICES, SYSTEMS, AND METHODS USING REACTIVE POWER INJECTION FOR ACTIVE TUNING ELECTRIC VEHICLE CHARGING SYSTEMS

CROSS REFERENCE TO RELATED APPLICATIONS

This application claims priority benefit under 35 U.S.C. § 119(e) to U.S. Provisional Patent Application No. 62/181,971 entitled "DEVICES, SYSTEMS, AND METHODS USING REACTIVE POWER INJECTION FOR ACTIVE TUNING ELECTRIC VEHICLE CHARGING SYSTEMS" filed on Jun. 19, 2015, the disclosure of which is hereby incorporated by reference in its entirety.

FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless power transfer systems that are capable of transferring power in free space (e.g., via a wireless field) to be used to charge the electric vehicle to overcome some of the deficiencies of wired charging solutions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for wirelessly providing power in an inductive power transfer system. The apparatus includes a transmitter configured to provide wireless power via a magnetic field sufficient to power or charge a load. The apparatus further includes an inverter coupled to the transmitter and configured to output an alternating electric current to the transmitter. The apparatus further includes a controller configured to receive a measurement of a load angle of the inverter. The controller further configured to compare the measured load angle to a reference load angle. The controller further configured to adjust the load angle of the inverter based at least in part on a difference between the measured load angle and the reference load angle.

Another aspect of the subject matter described in the disclosure provides a method for wirelessly providing power in an inductive power transfer system via a magnetic field sufficient to power or charge a load and for controlling a reactive power generated at a wireless power receiver. The method includes measuring a load angle of an inverter of a wireless power transmitter. The method further includes comparing the measured load angle to a reference load angle. The method further includes adjusting the load angle of the inverter based at least in part on a difference between the measured load angle and the reference load angle.

Another aspect of the subject matter described in the disclosure provides an apparatus for wirelessly providing power in an inductive power transfer system. The apparatus includes means providing wireless power via a magnetic field sufficient to power or charge a load. The apparatus further includes means for measuring a load angle of an inverter coupled to the providing means. The apparatus further includes means for comparing the measured load angle to a reference load angle. The apparatus further includes means for adjusting the load angle of the inverter based at least in part on a difference between the measured load angle and the reference load angle.

Another aspect of the subject matter described in the disclosure provides an apparatus for wirelessly providing power in an inductive power transfer system. The apparatus includes an inverter circuit configured to output an alternating electrical current. The apparatus further includes a resonant transmit circuit comprising a coil electrically connected in series to a capacitive element, the resonant transmit circuit operably coupled to the inverter circuit and configured to generate the magnetic field in response to being driven with the alternating electrical current. The apparatus further includes a controller configured to receive a value indicative of an electrical characteristic of the inverter. The controller further configured to determine an amount of reactive power in the wireless power system based on the electrical characteristic of the inverter circuit and further based on information about an expected operation of power conversion circuitry in the receiver to maintain output power to a load at the receiver substantially constant that causes an adjustment of reactive power in the system. The controller further configured to adjust an operating characteristic of the inverter circuit to cause an adjustment of the amount of reactive power in the wireless power transfer system to a target level based on the information about how the reactive power in the system is adjusted at the receiver based on the adjustment of the operating characteristic of the inverter circuit.

Another aspect of the subject matter described in the disclosure provides an apparatus for wirelessly transferring power via a magnetic field in a wireless power transfer system. The wireless power transfer system may include a receiver having a resonant receive circuit configured to inductively couple power via the magnetic field, and a power conversion circuit of the receiver configured to adjust an amount of reactive power in the wireless power transfer system to maintain an output power substantially constant in response to changes in the power received due to variations in coupling. The apparatus may comprise an inverter circuit configured to output alternating electrical current. The apparatus may further comprise a resonant transmit circuit comprising a coil electrically connected to a capacitive element, the resonant transmit circuit operably coupled to the inverter circuit and configured to generate the magnetic field in response to being driven with the alternating electrical current. The apparatus may further comprise a controller configured to receive a value indicative of an electrical characteristic of the inverter circuit, and adjust an operating characteristic of the inverter circuit to trigger a change in an electrical current in the receive circuit, the amount of adjustment of the operating characteristic of the inverter selected by the controller to cause adjustment of an amount of reactive power in the wireless power transfer system based on changes in the power conversion circuit that automatically occur to maintain the output power substantially constant in response to the change in the electrical current in the resonant receive circuit.

Another aspect of the subject matter described in the disclosure provides a method for wirelessly transferring power via a magnetic field in a wireless power transfer system. The wireless power transfer system may include a receiver having a resonant receive circuit configured to inductively couple power via the magnetic field, a power conversion circuit of the receiver configured to adjust an amount of reactive power in the wireless power transfers system to maintain an output power substantially constant in response to changes in the power received due to variations in coupling. The method may comprise outputting an alternating electric current to a wireless power transmitter. The method may further comprise generating, at the wireless power transmitter, the magnetic field in response to being driven with the alternating electrical current. The method may further comprise receiving a value indicative of an electrical characteristic of the wireless power transmitter. The method may further comprise adjusting an operating characteristic of the wireless power transmitter to trigger a change in an electrical current in the receiver, the amount of adjustment of the operating characteristic of the wireless power transmitter selected to cause adjustment of an amount of reactive power in the wireless power transfer system based on changes in the receiver that automatically occur to maintain the output power substantially constant in response to the change in the electrical current in the receiver.

Another aspect of the subject matter described in the disclosure provides an apparatus for wirelessly transferring power via a magnetic field in a wireless power transfer system. The wireless power transfer system may include a receiver having a resonant receive circuit configured to inductively couple power via the magnetic field, a power conversion circuit of the receiver configured to adjust an amount of reactive power in the wireless power transfers system to maintain an output power substantially constant in response to changes in the power received due to variations in coupling. The apparatus may comprise means for outputting an alternating electric current. The apparatus may further comprise means for generating the magnetic field in response to being driven with the alternating electrical current. The apparatus may further comprise means for receiving a value indicative of an electrical characteristic of means for outputting the alternating electric current. The apparatus may further comprise means for adjusting an operating characteristic of the means for outputting the alternating electric current to trigger a change in an electrical current in the receiver, the amount of adjustment of the operating characteristic of means for outputting the alternating electric current selected to cause adjustment of the amount of reactive power in the wireless power transfer system based on changes in the receiver that automatically occur to maintain the output power substantially constant in response to the change in the electrical current in the receiver Another aspect of the subject matter described in the disclosure provides a wireless power transfer system. The wireless power transfer system may comprise a wireless power receiver. The wireless power receiver may comprise a resonant receive circuit configured to inductively couple power via a magnetic field. The wireless power receiver may further comprise a power conversion circuit having a switching network and configured to adjust an amount of reactive power in the wireless power transfers system in response to adjusting states of the switching network to maintain an output power substantially constant in response to changes in the power received due to variations in coupling. The wireless power transfer system may further comprise a wireless power transmitter. The wireless power transmitter may comprise an inverter circuit configured to output alternating electrical current. The wireless power transmitter may further comprise a resonant transmit circuit comprising a coil electrically connected to a capacitive element, the resonant transmit circuit operably coupled to the inverter circuit and configured to generate the magnetic field in response to being driven with the alternating electrical current. The wireless power transmitter may further comprise a controller. The controller may be configured to receive a value indicative of an electrical characteristic of the inverter circuit. The controller may be further configured to adjust an operating characteristic of the inverter circuit to trigger a change in an electrical current in the receive circuit, the amount of adjustment of the operating characteristic of the inverter selected by the controller to cause adjustment of the amount of reactive power in the wireless power transfer system based on changes in the power conversion circuit that automatically occur to maintain the output power substantially constant in response to the change in the electrical current in the resonant receive circuit.

BRIEF DESCRIPTION OF THE DRAWINGS

FIGS. 7C and 7D are time sequence diagrams showing exemplary values of an inverter bridge voltage, an inverter bridge current, and a current of a vehicle pad of a parallel-tuned wireless power transfer system.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, magnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicle may be hybrid electric vehicles that include besides electric motors, a traditional combustion engine for direct locomotion or to charge the vehicle's battery. Other electric vehicles may draw all locomotion ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

Figure 1:
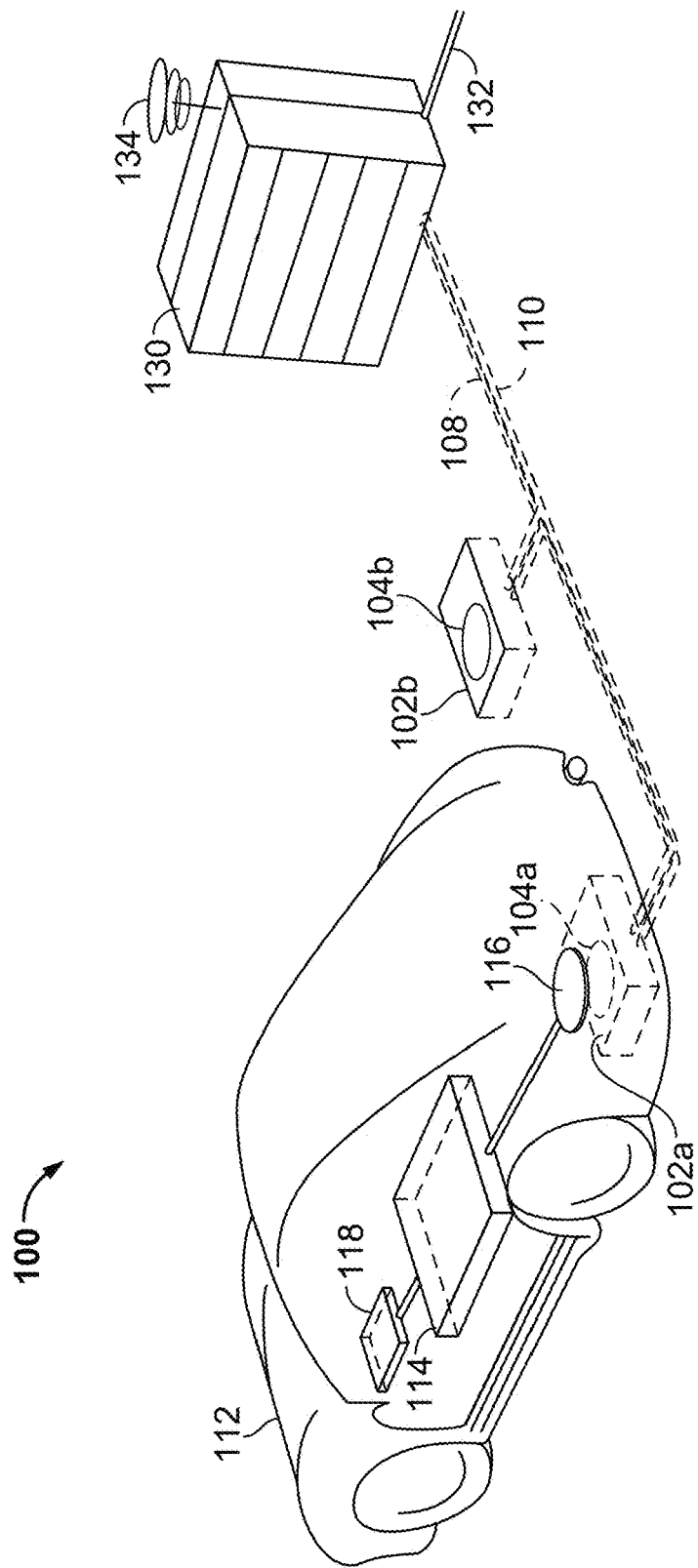
FIG. 1 illustrates an exemplary wireless power transfer system for charging an electric vehicle, in accordance with an exemplary embodiment of the invention.

FIG. 1 is a diagram of a wireless power transfer system 100 for charging an electric vehicle 112, in accordance with some implementations. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local distribution center 190 may be connected to a power backbone 192 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114.

The electric vehicle induction coil 116 may interact with the base system induction coil 104a for example, via a region of the magnetic field generated by the base system induction coil 104a.

In some implementations, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $\frac{1}{2}\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some implementations the electric vehicle induction coil 116 may be aligned with the base system induction coil 104a and, therefore, disposed within a near-field region simply by the driver positioning the electric vehicle 112 correctly relative to the base system induction coil 104a. In other implementations, the driver may be given visual feedback, auditory feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
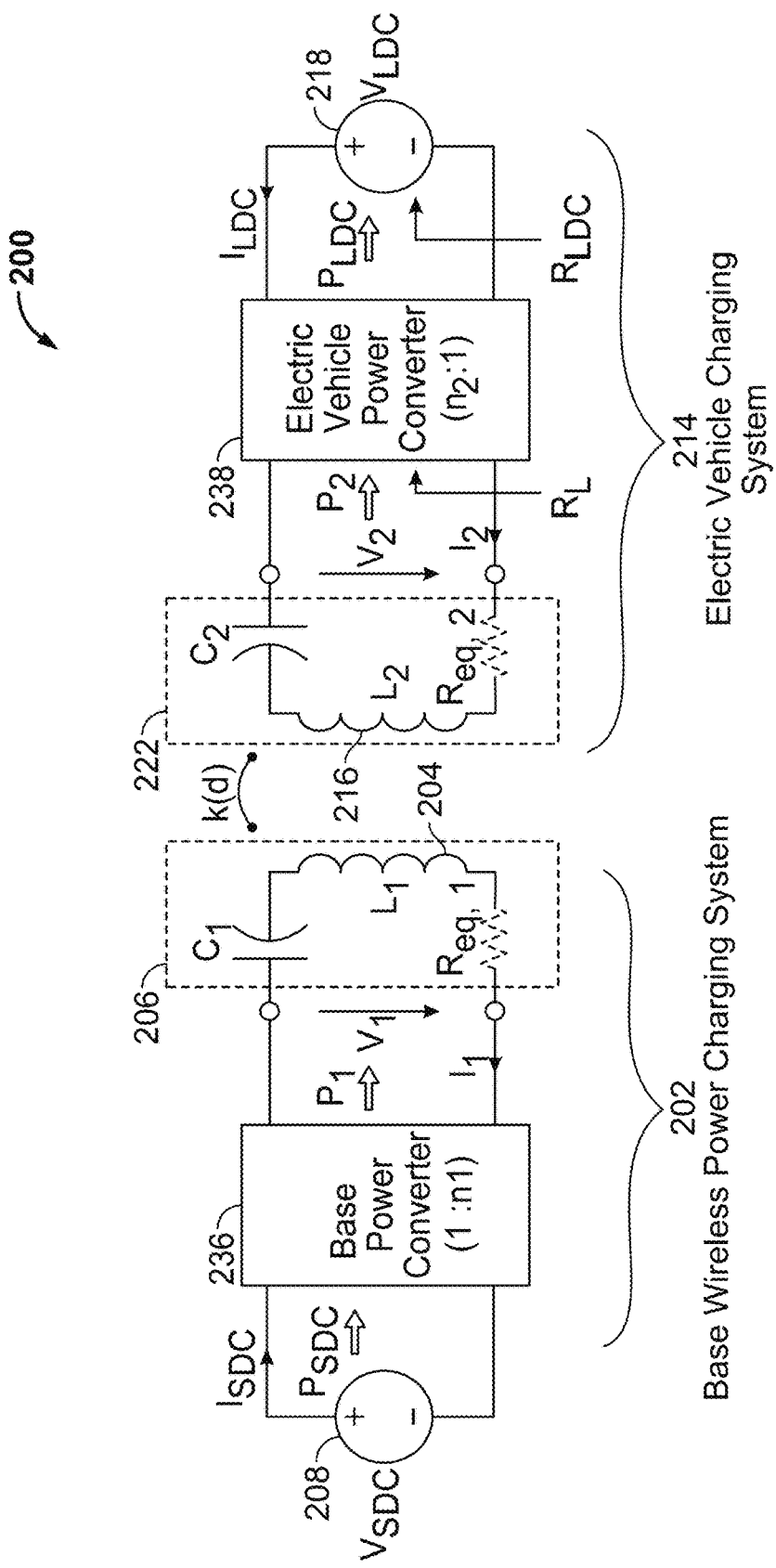
FIG. 2 is a schematic diagram of exemplary core components of the wireless power transfer system of FIG. 1.

FIG. 2 is a schematic diagram of core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 336. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit a magnetic field at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower) and, in some implementations, may be transferred at frequencies including but not limited to 85 kHz.

The base system transmit circuit 206 including the base system induction coil 204 and electric vehicle receive circuit 222 including the electric vehicle induction coil 216 may be tuned to substantially the same frequencies and may be positioned within the near-field of a magnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 216 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in a magnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed implementations may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger magnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates a magnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some implementations, coupling power between two induction coils that are in the near field of one another is disclosed. As described above, the near field may correspond to a region around the induction coil in which magnetic fields exist but may not propagate or radiate away from the induction coil. Near-field coupling-mode regions may correspond to a volume that is near the physical volume of the induction coil, typically within a small fraction of the wavelength. According to some implementations, magnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
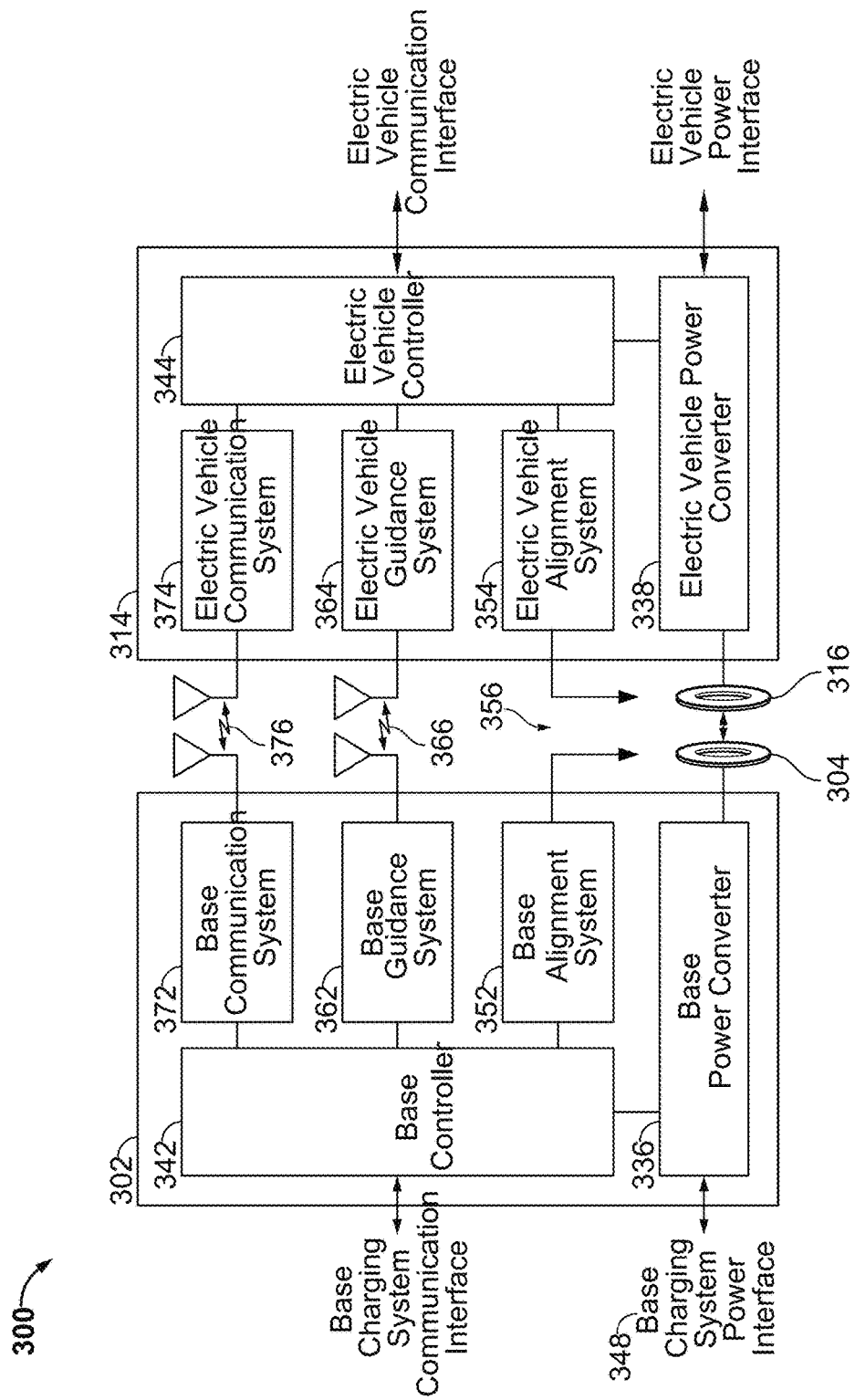
FIG. 3 is a functional block diagram showing exemplary core and ancillary components of the wireless power transfer system of FIG. 1.

FIG. 3 is another functional block diagram showing core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 186. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 234 includes an electric vehicle controller 344. The base charging system controller 342 may include a base charging system communication interface 212 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 234. This information may include information about electric vehicle characteristics, battery characteristics, charging status, and power capabilities of both the base wireless power charging system 302 and the electric vehicle charging system 234, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 214 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some implementations of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

It may be desirable in wireless power transfer systems (both static and dynamic) for a power receiving pad (e.g., electric vehicle induction coil 316) in electric vehicles to operate or accept power/charge from a base pad (e.g., base system induction coil 304) at various alignment positions in a given tolerance range specified by x, y, z coordinate limits. This may lead to varying pad inductances. Due to the fixed value of a tuning capacitor in either the electric vehicle induction coil 316 or base system induction coil 304 or both, detuning may occur in multiple of alignment points. The consequence of such detuning is reduced system efficiency due to an uncontrolled reactive loading of the system. In case of wireless power transfer systems, certain level of detuning may be unavoidable, nevertheless keeping the detuning as small as possible is desirable.

Certain parallel wireless power transfer systems rely on most of the control being based on the transmitter side. Change in transmitter side inverter voltage results directly in change of inverter current (reduction in voltage results in reduced current and hence reduced output power). On the other hand, series systems (e.g., wireless power transfer systems 200, 300) may have the control split between the transmitter (e.g., the base wireless power charging systems 202 and 302), and receiver (e.g., the electric vehicle charging systems 214 and 314) side. Transmitter controls the amount of energy being transmitted via the wireless coupling whereas the receiver controls the amount of energy that charges the battery. The series (e.g., when the capacitive element is electrically connected to the transmitter coil in series to form a series resonant circuit) approach may offer opportunities from the system control point of view. As described herein, it may be possible to effectively re-tune a wireless power transfer system during its operation in order to optimize the wireless power transfer system efficiency in all alignment positions. In other words, the active tuning approach described herein compensates for detuning effects which occur naturally in any wireless power transfer system due to different couplings and varying pad inductances in various alignment positions. This may be desirable in wireless power transfer for wireless electric vehicle charging (WEVC) applications where alignment, and hence coupling and pad inductance, variations, as well as efficiency requirements, due to high power may be restrictive. Alignment tolerances may result in considerable detuning of the wireless power transfer system and hence high losses which can be dealt with through additional cooling in a weight sensitive automotive environment. Furthermore, due to the series tuned topology, the active tuning through reactive power injection in the system described herein is facilitated primarily by the transmitter side and receiver side serves only as output current/power controller.

One implementation herein provides for a series-series IPT (inductive power transfer) system (e.g., both the transmitter and the receiver have series tuned resonant circuits) that uses duty cycle control in the rectifier (AC switching) in order to control the output current. The output current is controlled to provide a required output power in a particular operating point. A side effect of such control is reactive power injection into the system. In some aspects, the injected reactive power may appear capacitive on the vehicle side (e.g., the electric vehicle charging system 214) and inductive on the power supply (PSU) side (e.g., the base wireless power charging system 202). In accordance with implementations described herein, such reactive power injection can be used for active tuning of a WEVC (wireless electric vehicle charging) system compensating for various detuning effects. In other implementations, an IPT system may parallel-parallel IPT system (e.g., the transmitter and the receiver both have parallel tuned resonant circuits).

Figure 4A:
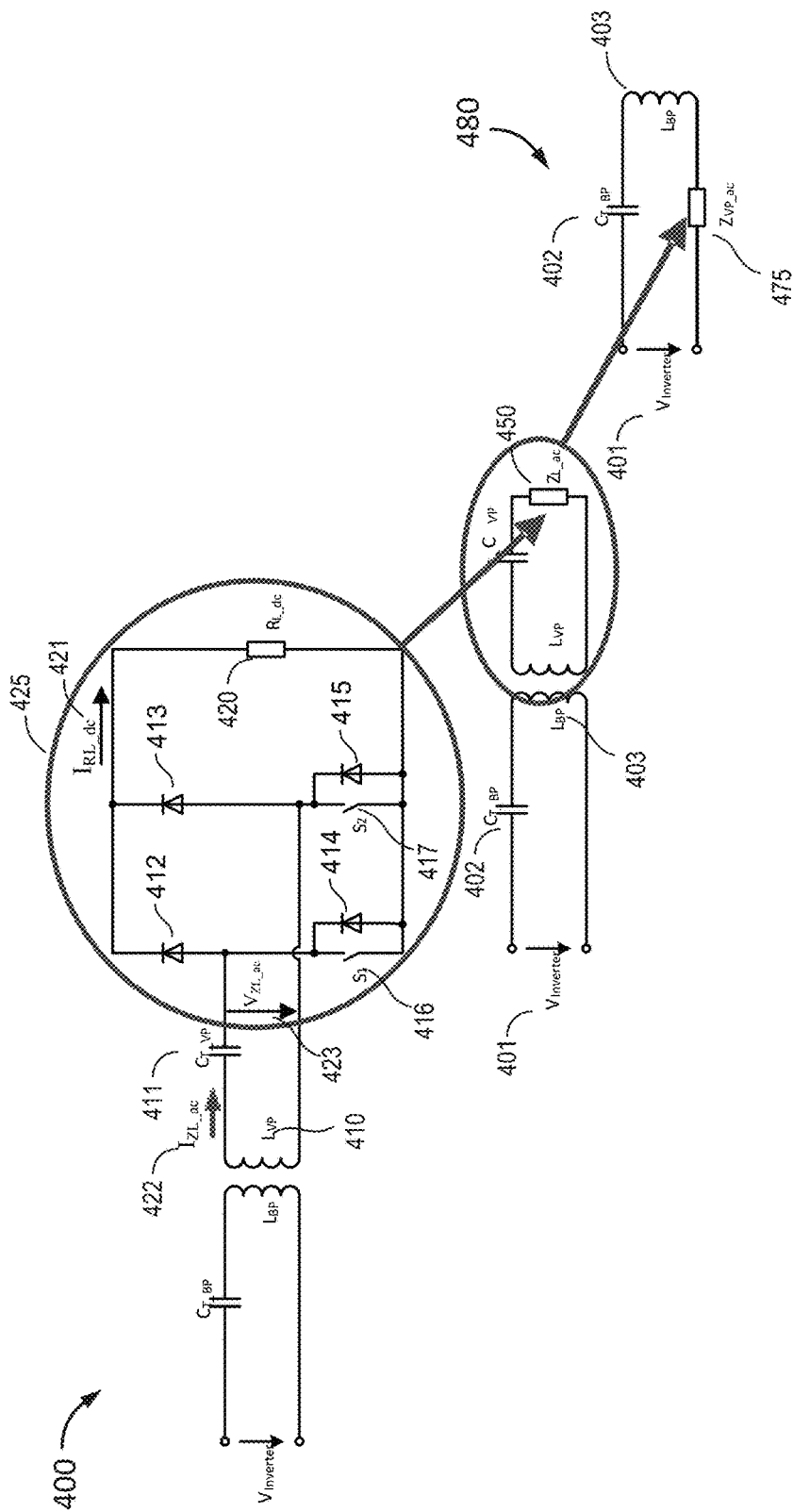
FIG. 4A is a circuit diagram of a series-tuned wireless power transfer system in accordance with embodiments described herein.

FIG. 4A is a diagram of a series-tuned wireless power transfer system 400. The wireless power transfer system 400 comprises a bridge inverter voltage $V_{inverter}$ 401, a tuning capacitor of the base pad $C_{T\_BP}$ 402, and an inductor of the base pad $L_{BP}$ 403 of the base pad on the PSU side (e.g., forming the primary side or in other words the base wireless power charging system 202 as shown in FIG. 2). The wireless power transfer system 400 further comprises on the electric vehicle side (e.g., secondary side) an inductor of the vehicle pad $L_{VP}$ 410, a tuning capacitor of the vehicle pad $C_{T\_VP}$ 411, and a rectifier 425 comprising four diodes 412-415, and at least one or two switches $S_1$ 416 and $S_2$ 417. In some embodiments, the rectifier 425 may comprise a full bridge or a half bridge rectifier. The load of the vehicle side is represented as a resistance $R_{L\_dc}$ 420. For purposes of illustrating some aspects of the system 400, the rectifier 425 and the resistance $R_{L\_ac}$ 420 may be represented by the circuit 450 which comprises impedance $Z_{L\_ac}$ 450. $Z_{L\_ac}$ 450 is the equivalent AC which takes AC switching into account. For the purposes of illustrating various aspects, the wireless power transfer system 400 can be further represented by the circuit 480 as shown on the bottom right side of FIG. 4A. The circuit 480 comprises bridge inverter voltage $V_{inverter}$ 401, $C_{T\_BP}$ 402, $L_{BP}$ 403, and $Z_{VP\_ac}$ 475. $Z_{VP\_ac}$ 475 represents a complex impedance which may represent impedance associated with all the vehicle side elements. As shown in FIG. 4A, the current running from the $L_{VP}$ 410 to the $C_{T\_VP}$ 411 comprises a current of the equivalent AC impedance $I_{ZL\_ac}$ 422. The voltage across the $L_{VP}$ 410 comprises a voltage of the equivalent AC impedance $V_{ZL\_ac}$ 423 and the current running through the $R_{L\_dc}$ 420 (or $Z_{L\_ac}$ 450) comprises a DC current of a load resistance $I_{RL\_dc}$ 421. In some embodiments, a duty cycle of one or both of switches $S_1$ 416 and $S_2$ 417 may be controlled by a controller (e.g., base controller 342).

Figure 4B:
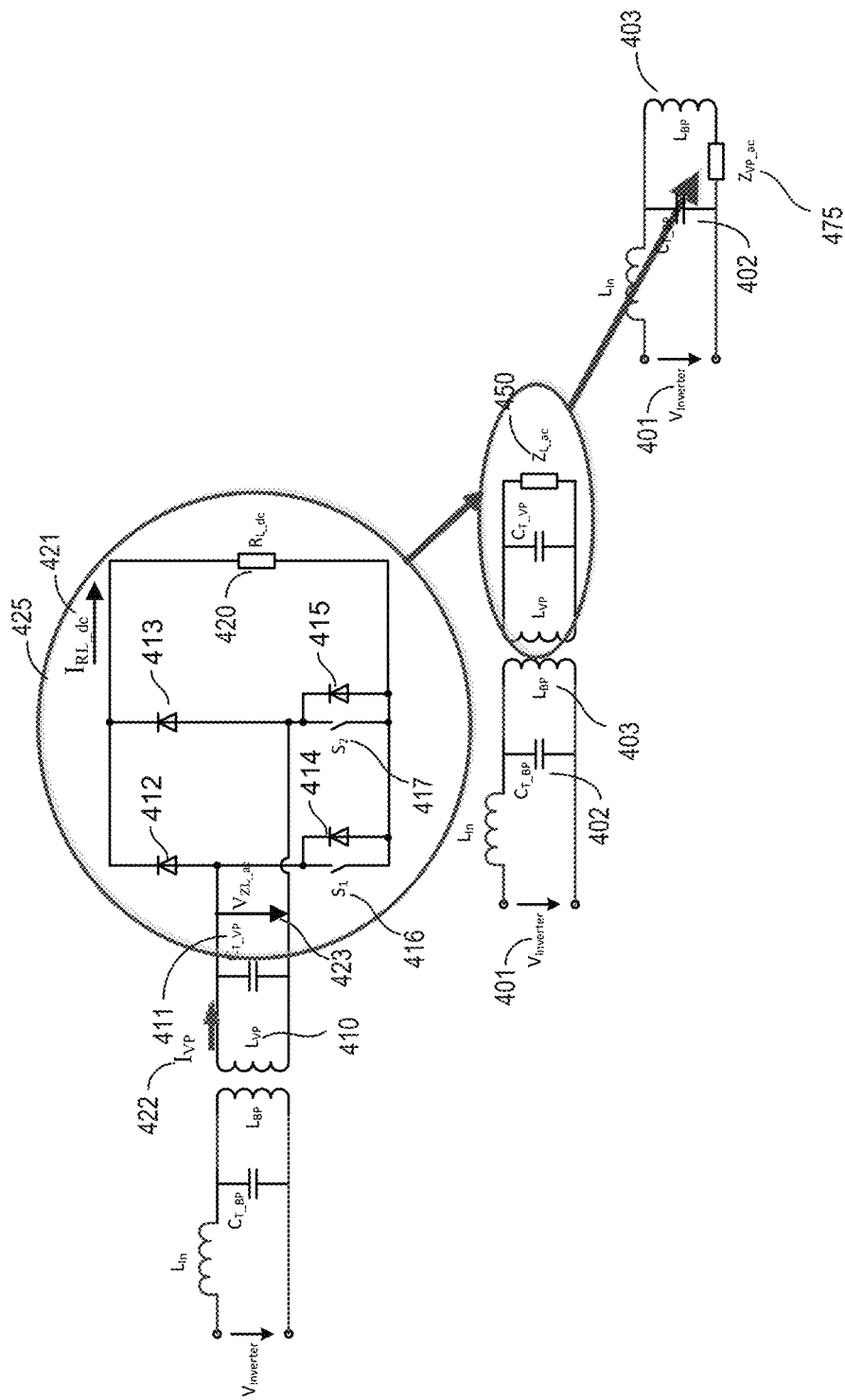
FIG. 4B is a circuit diagram of a parallel-tuned wireless power transfer system in accordance with embodiments described herein.

FIG. 4B is a diagram of parallel-tuned wireless power transfer system. The wireless power transfer system may be similar to the wireless power transfer system 400 of FIG. 4A, except that the resonant circuits of the transmitter and receiver are parallel circuits instead of series circuits (e.g., $C_{T\_BP}$ 402 and $L_{BP}$ 403 on the transmitter side, and $L_{VP}$ 410 and $C_{T\_VP}$ 411 on the receiver side are arranged in parallel).

Figure 5A:
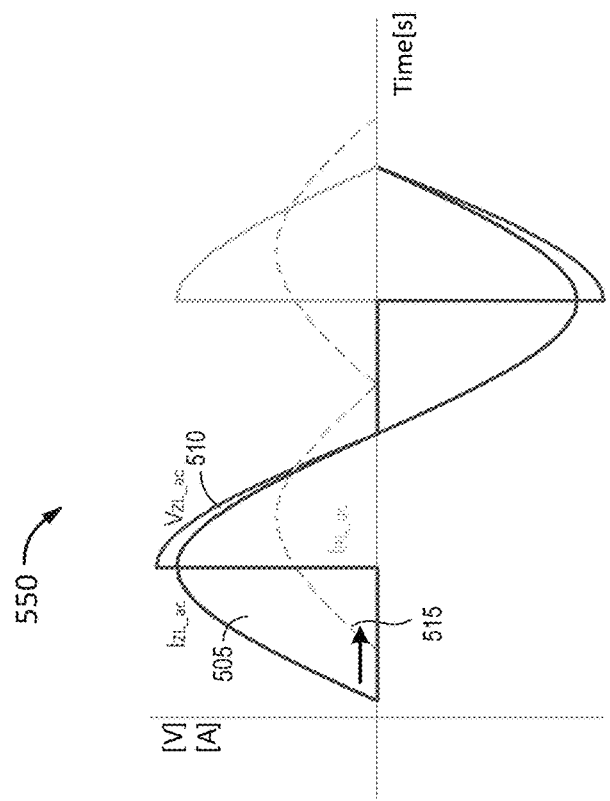
FIGS. 5A and 5B are time sequence diagrams showing exemplary values of a voltage and currents of a series-tuned wireless power transfer system.

FIG. 5A is a time sequence diagram 500 showing exemplary values of the voltage $V_{ZL\_ac}$ 423, current $I_{ZL\_ac}$ 422, and current $I_{RL\_dc}$ 421 of the series-tuned wireless power transfer system 400 of FIG. 4A. FIG. 5A shows three sinusoidal lines, a first line 505 representing the $V_{ZL\_ac}$ values, a second line 510 representing the $I_{ZL\_ac}$ values, and a third dashed line 515 representing the $I_{RL\_dc}$ values. As shown, the currents $I_{ZL\_ac}$ and $I_{RL\_dc}$, represented by lines 510 and 515 respectively, are nearly identical indicating that the current passing through the vehicle side or vehicle pad (i.e., rectifier 425) with minimal delay and a small control angle (indicating a duty cycle of the rectifier).

Figure 5B:
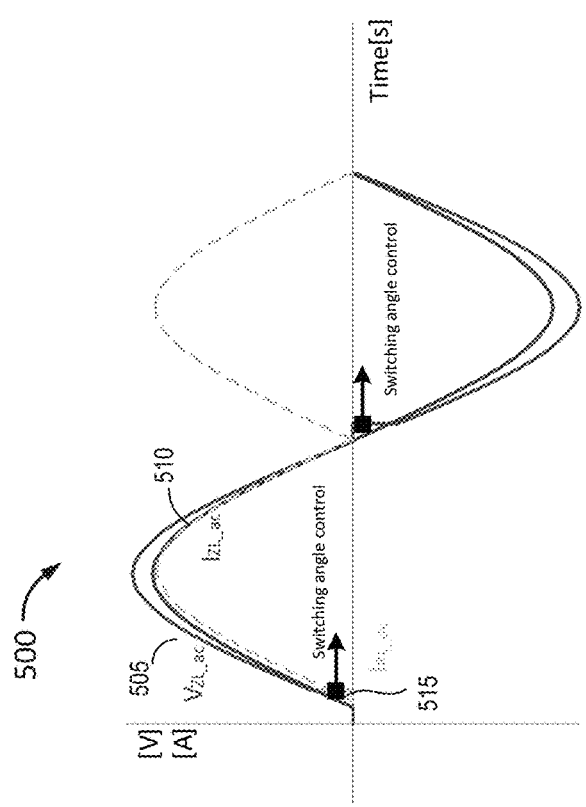

FIG. 5B is another time sequence diagram 550 showing exemplary values of the voltage $V_{ZL\_ac}$ 423, current $I_{ZL\_ac}$ 422, and current $I_{RL\_dc}$ 421 of the wireless power transfer system 400 of FIG. 4A with a larger control angle than that used in the diagram 500 of FIG. 5A. FIG. 5B comprises the same lines 505, 510, and 515. In this embodiment, a duty cycle or one or both of the switches $S_1$ 416 and $S_2$ 417 of FIG. 4A have been adjusted which results in shifting the phase and adjusting the amplitude of the $I_{RL\_dc}$ line 515 as shown in FIG. 5B. The adjustment of the duty cycle of the switches $S_1$ 416 and $S_2$ 417 of FIG. 4A also introduces reactive power into the wireless power transfer system (e.g., wireless power transfer system 400). Accordingly, by controlling the duty cycle of the switches $S_1$ 416 and $S_2$ 417 of FIG. 4, it is possible to control an amount of reactive power being introduced or injected into a wireless power transfer system. Furthermore, controlling the duty cycle of the switches $S_1$ 416 and $S_2$ 417 can be used, for example to regulate the output voltage to maintain the output provided to the load at a target level (e.g., substantially constant output over a period in which an output voltage has been selected by the system for providing to the load). In addition, controlling the reactive power can be used to tune the secondary resonant circuit (e.g., to bring the resonant circuit closer to or a way from a resonant condition during operation).

Figure 5C:
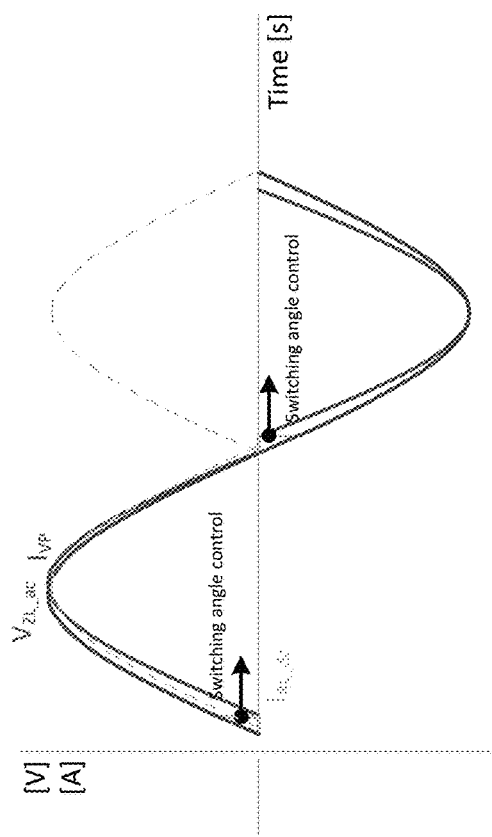
FIGS. 5C and 5D are time sequence diagrams showing exemplary values of a voltage and currents of a parallel-tuned wireless power transfer system.
Figure 5D:
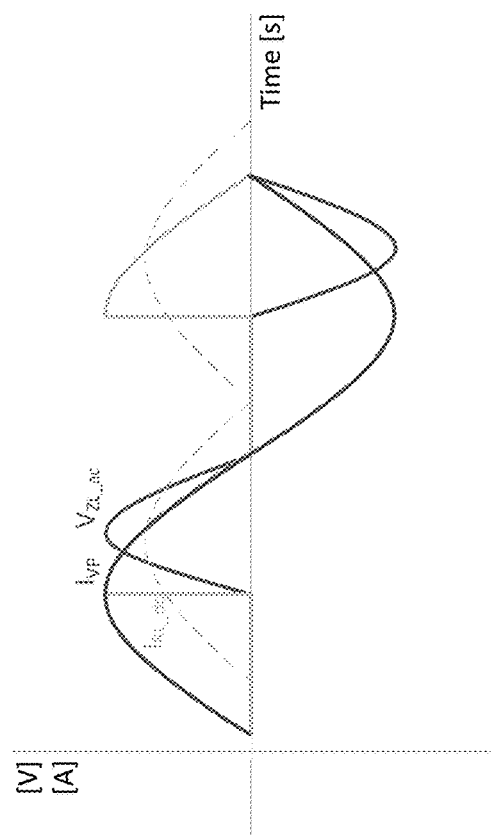

FIGS. 5C and 5D are time sequence diagrams showing exemplary values of the voltage $V_{ZL\_ac}$ 423, current $I_{ZL\_ac}$ 422, and current $I_{RL\_dc}$ 421 of the parallel-tuned wireless power transfer system of FIG. 4B, wherein the time sequence diagram illustrated in FIG. 5D corresponds to a larger control angle than that used in the diagram of FIG. 5C. Similar to the series-tuned wireless power transfer system, the receiver in the parallel-tuned system may be configured to control the output current to a value requested by the battery management system. In some embodiments, this is done via controlling the active rectifier switching angle (e.g., the load angle). As can be observed in FIGS. 5A-5D, the control of output current may result in phase shift between the voltage and current which injects reactive power into the system. In conventional operation, reactive power injection may be a negative side effect due to additional losses. However, in conjunction with the primary inverter control and system tuning, the amount of reactive power can be controlled to a point with the highest system efficiency. As illustrated in FIGS. 5C and 5D, the voltage $V_{ZL\_ac}$ 423, current $I_{ZL\_ac}$ 422, and current $I_{RL\_dc}$ 421 in the parallel-tuned wireless power transfer system may be substantially identical as in the series-tuned wireless power transfer system.

Without compensation as described herein, the reactive power injection could introduce various losses. For example, unbalanced reactive power may result in thermal losses, voltage differences between the source and sink, and a decrease in voltage stability, among other factors. However, in accordance with aspects of various implementations described herein, in conjunction with the primary inverter control and active system tuning, reactive power injection can be used to control the amount of reactive power to a point with the highest system efficiency.

Figure 6:
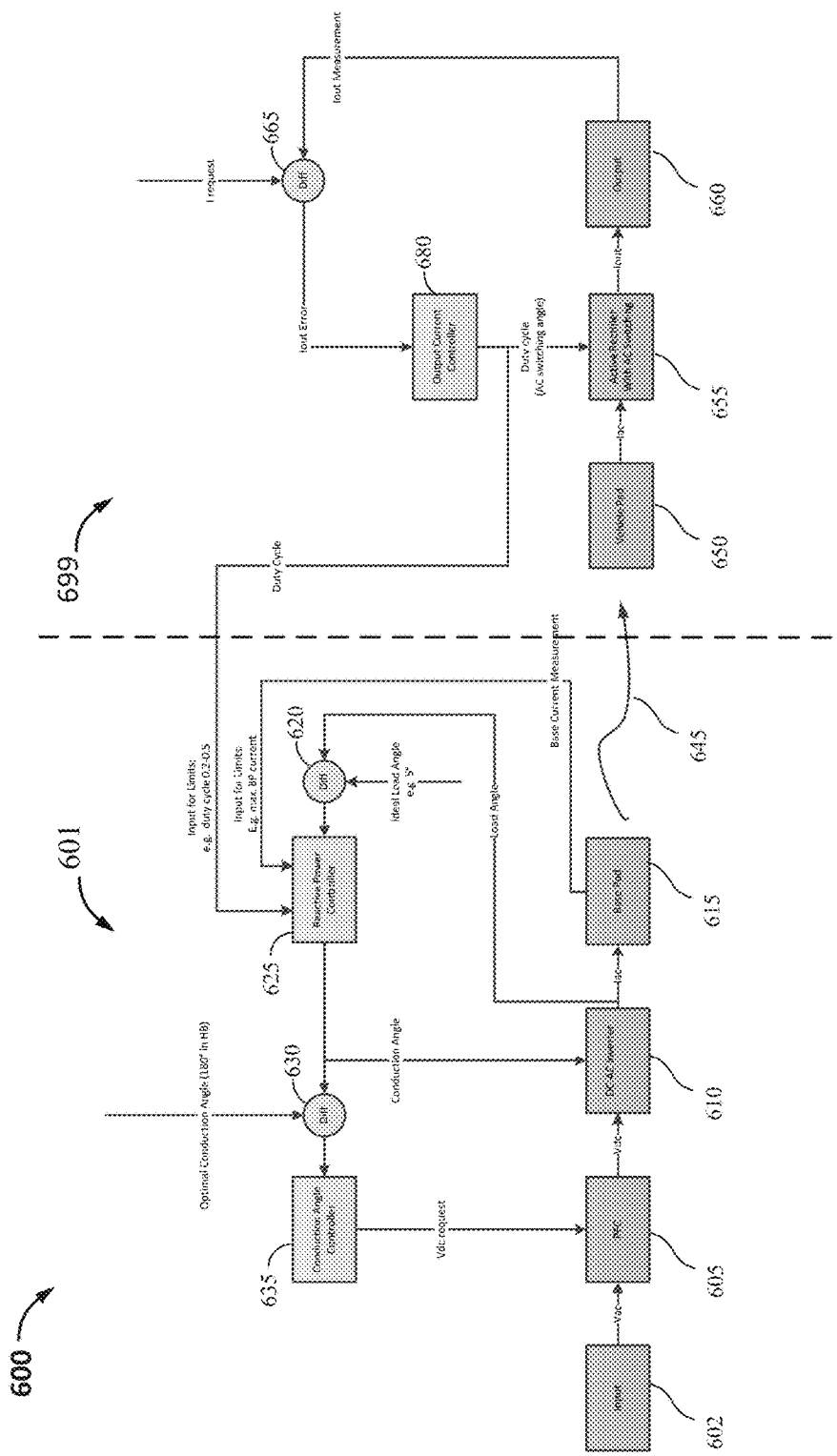
FIG. 6 is a functional block diagram of an exemplary wireless power transfer system.

FIG. 6 is a functional block diagram of an exemplary wireless power transfer system 600. The charging system 600 may comprise a wireless power transmitter system 601 and a wireless power receiver system 699. The wireless power transmitter system 601 may comprise components found in the wireless power transfer systems 100, 200, 300, and 400. The wireless power receiver system 699 may comprise components found in the electric vehicle 112. The wireless power transmitter system 601 may comprise an input 602. The input 602 may comprise an external power source that may supply alternating current (AC) voltage/current to a power factor correction (PFC) unit 605. The PFC unit 605 may adjust the power factor of the input 602 and may convert the AC voltage/current to a direct current (DC) voltage/current. The PFC unit 605 may also improve the stability and efficiency of the input 602. The PFC unit 605 may then supply DC voltage/current to a DC/AC voltage inverter 610. The DC/AC voltage inverter 610 converts the DC voltage to an AC current. The DC/AC voltage inverter 610 may then provide the AC current to a base pad 615.

The base pad 615 may be similar to the base wireless charging system 102a, the base system transmit circuit 206, and the base system induction coil 204. For example, the base pad 615 may comprise components similar to those described above with respect to the transmitter 104 and the base system induction coil 304 of FIGS. 1-3. In some embodiments, the base pad 615 may comprise a pad comprising at least a portion of the components of the base system transmit circuit 206. The base pad 615 is configured to generate a magnetic field 645 to provide wireless power to the wireless power receiver system 699 based on the AC current received from the DC/AC voltage inverter 610. The power transmit circuit of base pad 615 may comprise a wireless power transmit element similar to the transmit antennas/coils described above. In some embodiments, the base pad 615 may include or have components corresponding to one or more of the blocks of the wireless power transmitter system 601. For example, the base pad 615 may include a base pad controller (not shown), the input 602, the PFC unit 605, the DC/AC voltage inverter 610, a reactive power controller 625 (discussed more fully below) and a conduction angle controller 635 (discussed more fully below). In some embodiments, the base pad 615 may include a primary resonator. In some embodiments, a control scheme for reactive power may be implemented in the reactive power controller 625, while in other embodiments, the control scheme for reactive power may be implemented by another component (e.g., a bridge controller).

The wireless power receiver system 699 may comprise a vehicle pad 650. The vehicle pad 650 may be similar to the electric vehicle induction coil 116, the electric vehicle resonant circuit 222, electric vehicle induction coil 316 of FIGS. 1-3. For example, the vehicle pad 650 may comprise components similar to those described above with respect to the electric vehicle resonant circuit 222 of FIG. 2. The vehicle pad 650 may be configured to receive wireless power from the power transmit circuit of the base pad 615 via the magnetic field 645. In some embodiments, the vehicle pad 650 may include one or more of the blocks of the wireless power receiver system 699. For example, the vehicle pad 650 may include an active rectifier with AC switching 655, an output unit 660, a voltage/current measure comparator or differentiator 665, and/or an output current controller 680. In some embodiments, the active rectifier with AC switching 655 may comprise components similar to those of the rectifier 425 of FIG. 4A or 4B. In some embodiments, the vehicle pad 650 may include a secondary resonator. The wireless power receiver system 699 may also include a vehicle controller (not shown) that may include a processor and/or other controller circuitry configured to control or coordinate functions performed by the blocks shown in the wireless power receiver system 699.

The magnetic field 645 produces an AC current at the vehicle pad 650 and the vehicle pad 650 then supplies that current to the active rectifier with AC switching 655. The active rectifier with AC switching 655 converts the AC current into an output current. The active rectifier with AC switching 655 then supplies the output current to the output unit 660. The output unit 660 then supplies a measurement of the output current to the voltage/current measure comparator or differentiator 665. The voltage/current measure comparator or differentiator 665 compares the measurement of the output current from the output unit 660 with an electrical current (or voltage) request. In some embodiments, the electrical current request is received from the vehicle controller or from a battery management system of the electric vehicle. The comparator or differentiator 665 then sends the difference between the current request and the measurement of the output current as an output current error to the output current controller 680. The output current controller 680 may be configured to automatically maintain the output current and/or output power of the wireless power receiver system 699 at a substantially constant level. The output current controller 680 may adjust a duty cycle (e.g., AC switching angle) of the active rectifier with AC switching 655 to maintain the output current and output power at a substantially constant level in response to changes in received power (e.g., due to variations in coupling). As discussed above with respect to FIGS. 4A and 5B, the adjustment of the duty cycle by the output current controller 680 may inject reactive power into the exemplary wireless power transfer system 600. As such, the output current controller 680 and active rectifier 655 may collectively comprise a power conversion circuit configured to automatically adjust an amount of reactive power in the wireless power transfer system to maintain an output power substantially constant in response to changes in the power received due to variations in coupling.

In some embodiments, in order to better compensate for the injected reactive power at the wireless power receiver system 699, the output current controller 680 may also send an indication of a threshold limit for at least an operation parameter of the wireless power receiver system 699. In some aspects, the information may comprise information regarding the duty cycle of the active rectifier with AC switching 655 to the wireless power transmitter system 601. For example, the information regarding the duty cycle may comprise certain threshold limits for the duty cycle. In some aspects, the limits may indicate that the maximum duty cycle is 0.5 or 50% and the minimum duty cycle is 0.1 or 10%.

In some embodiments, feedback regarding the duty cycle of the active rectifier with AC switching 655 from the output current controller 680 is received by the reactive power controller 625 (e.g., information transmitted via a communication link between the wireless power transmitter system 601 and the wireless power receiver system 699). The reactive power controller 625 controls the reactive power in the wireless power transfer system 600 based on one or more of the difference between a measurement of the load angle and an ideal load angle (e.g., an indication of the phase angle between the DC/AC voltage inverter 610 voltage and current, also referred to as a switching angle), threshold limits for the base pad current generated by the DC/AC voltage inverter 610, and threshold limits for a duty cycle of a vehicle rectifier (e.g., active rectifier with AC switching 655 discussed above). In addition to supplying the AC current to the base pad 615, the DC/AC voltage inverter 610 may also supply a measurement of a load angle of the DC/AC voltage inverter 610 to a comparator or differentiator 620. The differentiator 620 compares the measurement of the load angle of the DC/AC voltage inverter 610 to an "ideal load angle". The ideal load angle may be a pre-defined value or may be pre-configured within the wireless power transfer system 600 or may be located within a look-up table which contains different ideal load angles for different system parameters/configurations. In some aspects, the ideal load angle may comprise a value close to zero (e.g., 5 degrees). The ideal load angle may also comprise a value where the wireless power transfer system 600 is operating at maximum efficiency. The comparator or differentiator 620 then sends the difference between the measurement of the load angle and the ideal load angle to a reactive power controller 625.

As discussed above, the reactive power controller 625 controls the reactive power in the wireless power transfer system 600 based on the inputs from the base pad 615, the DC/AC voltage inverter 610, and the output current controller 680. For example, the reactive power controller 625 may receive from the differentiator 620 information that the difference between the measurement of the load angle (e.g., 20 degrees) and the ideal load angle (e.g., 5 degrees) is 15 degrees. The reactive power controller 625 may determine that there is too much reactive power that is being generated in the wireless power transfer system 600. The reactive power controller 625 may then signal the DC/AC voltage inverter 610 to lower its voltage duty cycle for lowering the corresponding current supplied to the base pad 615 which results in a lower amount of current supplied to the vehicle pad 650. The lower current supplied to the vehicle pad 650 reduces the amount of reactive power being injected into the wireless power transfer system 600. For example, the lower current supplied to the vehicle pad 650 reduces a difference between the output current measurement and the current request so that the output current controller 680 may reduce the duty cycle of the active rectifier with AC switching 655 which results in a lower amount of reactive power being generated. Consequentially, the load angle of the DC/AC voltage inverter 610 would also be reduced and the difference between the measurement of the load angle and the ideal load angle will also be reduced.

Figure 7B:
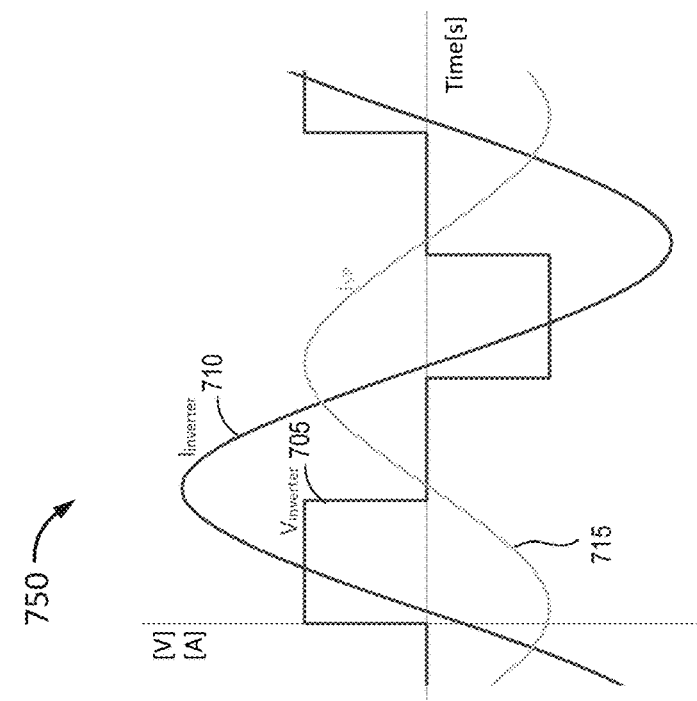
FIGS. 7A and 7B are time sequence diagrams showing exemplary values of an inverter bridge voltage, an inverter bridge current, and a current of a vehicle pad of a series-tuned wireless power transfer system.
Figure 7A:
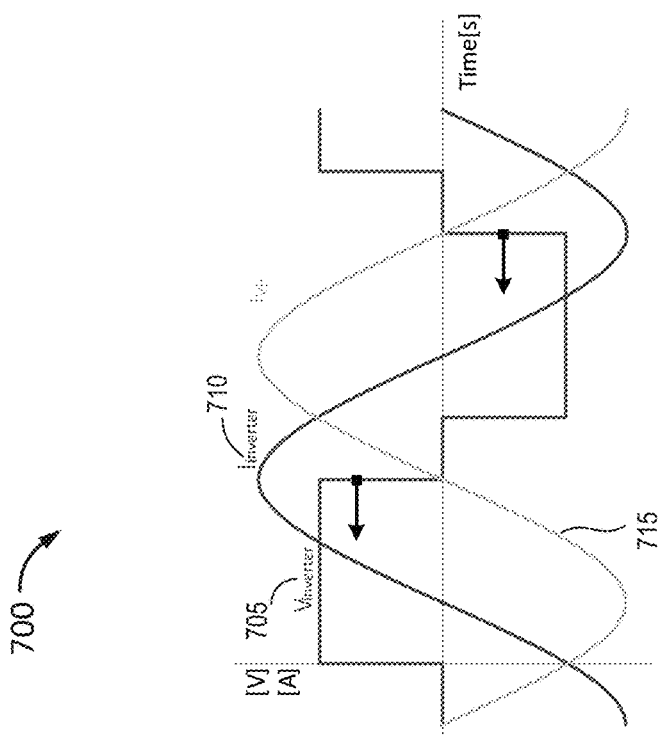

FIG. 7A is a time sequence diagram 700 showing exemplary values of an inverter bridge (e.g., DC/AC voltage inverter 610) voltage $V_{inverter}$, the inverter bridge current $I_{inverter}$, and a current of a vehicle pad (e.g., vehicle pad 650) $I_{VP}$ of the wireless power transfer system 600 of FIG. 6, wherein the power transfer system 600 is a series-series power transfer system. FIG. 7A shows three lines, a first line 705 representing the $V_{inverter}$ values, a second sinusoidal line 710 representing the $I_{inverter}$ values, and a third sinusoidal line 515 representing the $I_{VP}$ values. FIG. 7A may be illustrative of a case where the reactive power controller 625 of FIG. 6 determines that reactive power of the wireless power transfer system 600 is too high and determines to reduce the duty cycle of the DC/AC voltage inverter 610 (as indicated by the arrows). FIG. 7B is another time sequence diagram 750 showing different exemplary values of the $V_{inverter}$, $I_{inverter}$, and $I_{VP}$ discussed with respect to FIG. 7A. In FIG. 7B, the duty cycle of the $V_{inverter}$ has been reduced as compared to the duty cycle of FIG. 7A as represented by line 705. This results in a higher $I_{inverter}$ and a lower $I_{VP}$. Because the output current controller 680 wishes to maintain a constant output current, the lower $I_{VP}$ would also reduce the duty cycle of the active rectifier with AC switching 655 which results in less reactive power in the system. Thus, changing the $V_{inverter}$ shown by line 705 results in indirectly changing the $I_{inverter}$ shown by line 710 as well. Therefore, reducing the reactive power to its minimum (i.e., very small load angle) may result in higher losses in the DC/AC voltage inverter 610 due to higher inverter (bridge) currents. Hence, it may be desirable to control the angle between the bridge inverter voltage and current also with respect to the base pad current to find the best system operating point. The reactive power controller 625 can then control the output voltage of the DC/AC voltage inverter 610 which in consequence controls the vehicle pad current, $I_{VP}$, since in a series system:

$$I_{VP} = \frac{V_{inverter}}{\omega \cdot M_{12}}$$

where $M_{12}$ is the mutual inductance between the base pad 615 and vehicle pad 650 and $I_{VP}$ is the vehicle pad current. Increasing the bridge inverter voltage ($V_{inverter}$) increases the $I_{VP}$ which means the switching angle in the active rectifier with AC switching 655 needs to increase as well in order to maintain the constant output current. This results in more reactive power injected into the wireless power transfer system 600 at the same operating point. Reducing the $V_{inverter}$ and hence the $I_{VP}$ results in just the opposite. Depending on the alignment point and the resulting couplings and inductances, more or less reactive power might be necessary to compensate for the detuning effect. Assuming the output current controller 680 is active, the reactive power controller 625 can then, within certain limits (defined by max pad currents and max/min AC switching angle), control how much reactive power is injected into the wireless power transfer system 600. This approach is illustrated in FIG. 7A discussed above where the reactive power gets first measured by the phase angle between the bridge inverter voltage and current (also called load angle or the switching angle, measured as a difference between the inverter switching state change command and a zero current crossing detection instant as detected by a current sensor and associated circuitry) and then in FIG. 7B, the reactive power is modified by changing the bridge inverter voltage which results in changed reactive power injection like explained above. This approach allows the wireless power transmitter system 601 to do both, assessing and modifying the reactive power in the wireless power transfer system 600 to maximize the system efficiency whereas the wireless power receiver system 699 side performs the autonomous output current control.

FIGS. 7C and 7D illustrate time sequence diagrams 720 and 730 showing exemplary values of an inverter bridge (e.g., DC/AC voltage inverter 610) voltage $V_{inverter}$, the inverter bridge current $I_{inverter}$, and a current of a vehicle pad (e.g., vehicle pad 650) $I_{VP}$ of the wireless power transfer system 600 of FIG. 6, wherein the power transfer system 600 is a parallel-parallel power transfer system. In comparison to a series-series power transfer system, the vehicle pad current $I_{VP}$ is not directly dependent on the bridge inverter voltage ($V_{inverter}$). In addition, in a parallel-parallel arrangement the base pad current $I_{BP}$ (not shown) and bridge current $I_{inverter}$ are not the same, the base pad current $I_{BP}$ being directly correlated with the voltage $V_{inverter}$, thus decreasing as the duty cycle of $V_{inverter}$ decreases.

In a parallel-tuned receiver, the active rectifier switching angle directly controls the vehicle pad current $I_{VP}$. The receiver may control the output power, which may be characterized as:

$$P_{out} = j\omega M_{12} I_{BP} I_{VP}$$

The increasing the bridge inverter voltage ($V_{inverter}$) increases the base pad current $I_{BP}$, which means the switching angle in the rectifier needs to increase as well in order to maintain a constant output current ($I_{RL\_dc}$) and output power. This results in more reactive power injected into the system at the same operating point. On the other hand, reducing the bridge inverter voltage and hence the base pad current results the opposite effect (e.g., decreased switching angle, less reactive power).

However, as discussed above, the reactive power controller 625 may not be able to indefinitely reduce or raise the voltage and/or current of the DC/AC voltage inverter 610. In some aspects, the duty cycle of the active rectifier with AC switching 655 may be approaching 0 and thus, the reactive power controller 625 may be unable to further reduce the load angle and thus, the injected reactive power. In other aspects, the active rectifier with AC switching 655 may have an upper threshold duty cycle limit that prevents the active rectifier with AC switching 655 from becoming overloaded. Similarly, the base pad 615 may be configured to operate within certain limits (e.g., maximum current levels). In some aspects, the reactive power controller 625 receives an indication of the threshold limits of an operation parameter (e.g., base pad current) of the base pad 615. Accordingly, the reactive power controller 625 may use the threshold limits received from the output current controller 680 and base pad 615 to ensure the wireless power transfer system 600 operates within those limits or to shut down power transfer when those limits have been reached or satisfied.

The reactive power controller 625 may also transmit a conduction angle to a differentiator 630. The differentiator compares the conduction angle received from the reactive power controller 625 to an optimal conduction angle and sends the difference to the conduction angle controller 635. The optimal conduction angle may be pre-configured within the wireless power transfer system 600 or may be located within a look-up table which contains different optimal conduction angles for different system parameters/configurations. The conduction angle controller 635 may then adjust a DC voltage request to the PFC unit 605 to adjust the DC voltage the PFC unit 605 supplies to the DC/AC voltage inverter 610.

In some embodiments, the wireless power transfer system 600 may be initially detuned in order for the active tuning using the injected reactive power to function effectively. In some embodiments, one or both of the wireless power transmitter system 601 and the wireless power receiver system 699 may be initially configured to operate in a detuned state. In some aspects, a value of a capacitor of the base pad 615 and/or a value of a capacitor of the vehicle pad 650 may be chosen to detune the wireless power transmitter system 601 or the wireless power receiver system 699. In some aspects, the initial detune configuration may be beneficial in that it may allow the wireless power transfer system 600 to stay inductive in all alignment positions between the base pad 615 and the vehicle pad 650, but may be the least inductive or minimally inductive as possible. In some embodiments, the initial value for the capacitor is a value that is relatively large so that when the wireless power transfer system 600 performs active tuning, the additional capacitor added through the AC switching functions lowers the total capacitance to help move the wireless power transfer system 600 toward a tuned state. In some aspects, initially detuning one or both of the wireless power transmitter system 601 may comprise maintaining an inductance state at a minimum level in the wireless power transmitter.

For example, the capacitor value for the base pad 615 may be chosen so that the base pad 615 is operative at a maximum inductance value. In some aspects, the maximum inductance value is based on a given tolerance range specified by x, y, z coordinate limits for different alignment positions of the base pad 615 and the vehicle pad 650 of the wireless power transfer system 600. For example, if a vehicle is parked such that the vehicle pad 650 is outside the tolerance range for the x, y, z position, the base pad 615 would not transfer power to the vehicle pad. In maximum inductance embodiment, when the vehicle pad 650 enters a charging region of the base pad 615, the inductance value of the base pad 615 may decrease and cause the vehicle pad 650 to be out of tune with the base pad 615. In this case, the reactive power controller 625 may increase or decrease the reactive power injected into the system by adjusting a load angle and/or a conduction angle of the wireless power transmitter system 601 to tune the base pad 615 to the vehicle pad 650.

In some embodiments, active tuning using reactive power may include initially increasing a current in the vehicle pad 650 to a maximum value. The output current controller 680 may then control the AC switching angle/duty cycle of the active rectifier with AC switching 655 to maintain a constant output current and output power. The adjustment of the AC switching angle/duty cycle of the active rectifier with AC switching 655 may inject reactive power into the wireless power transfer system 600. The reactive power controller 625 may compensate for this injected reactive power by monitoring the load angle of the DC/AC voltage inverter 610 and making sure that the difference between the load angle and the ideal load angle does not become negative (e.g., respectively smaller than a certain minimal value). In some aspects, during normal operation, output voltage/current may vary due to a battery of the vehicle being charged, vehicle pad 650 current and the AC switching angle/duty cycle of the active rectifier with AC switching 655 may be continuously adjusted (e.g., by the reactive power controller 625) in order to substantially maintain the ideal load angle with respect to certain threshold limits (e.g., a maximum base pad current, AC duty cycle min/max, etc.) in the wireless power transfer system 600.

Figure 8:
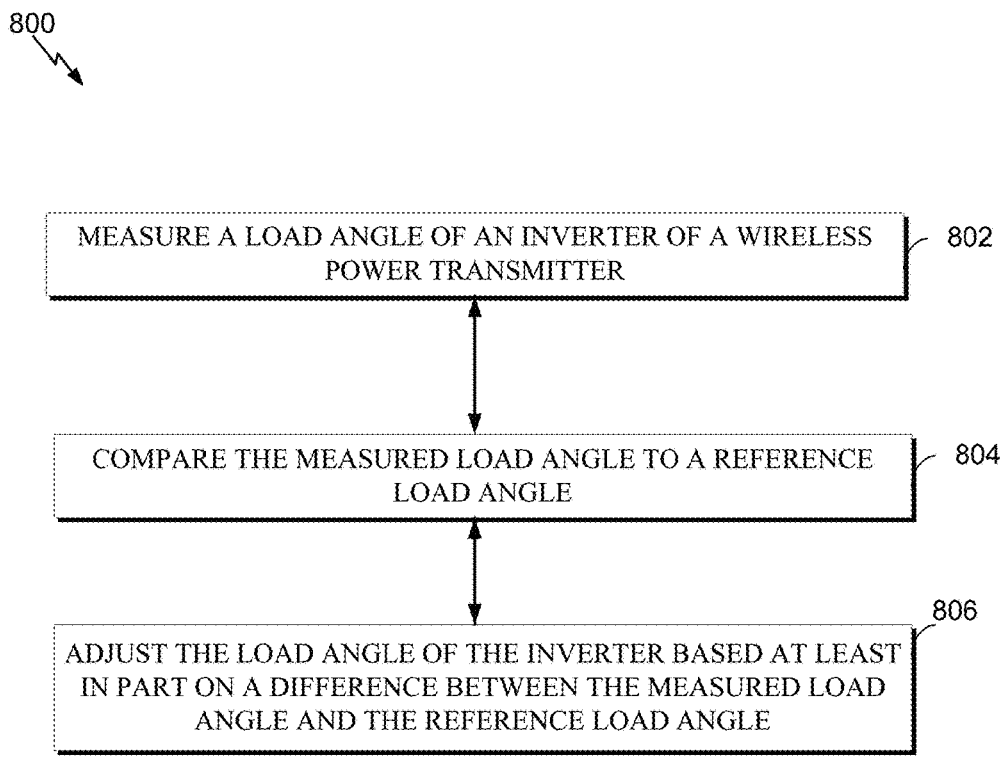
FIG. 8 depicts a flowchart of an exemplary method of wirelessly providing power via a magnetic field sufficient to power or charge a load and for controlling a reactive power generated at a wireless power receiver according to one embodiment of a wireless power transfer system.

FIG. 8 depicts a flowchart of an exemplary method 800 of charging an electric vehicle according to the wireless power transfer system. The method shown in FIG. 8 may be implemented via one or more devices in the wireless power transmitter system 601 similar to the base wireless charging system 102a, the base system transmit circuit 206, the base system induction coil 204, base system induction coil 304, the base pad 615, the DC/AC voltage inverter 610 and the reactive power controller 625 of FIGS. 1, 2, 3, 5, and 6. In one embodiment, once the electric vehicle 112 (FIG. 1) approaches the base pad 615, the vehicle pad 650 (or the base pad 615) may initiate a wireless power transfer process.

At block 802, the wireless power transmitter system measures a value indicative of an electrical characteristic an inverter of a wireless power transmitter. The inverter may comprise the DC/AC voltage inverter 610. In some embodiments, the electrical characteristic corresponds to a load angle of the inverter circuit.

At block 804, the wireless power transmitter system (e.g., at the reactive power controller 625) may compare the measured load angle to a reference load angle in order to determine an amount of reactive power. In some embodiments, the reference load angle may correspond to a predefined value or a valued located in a look-up table. In some embodiments, the wireless power transmitter system determines amount of reactive power in the wireless power transfer system based on the load angle of the inverter and information on how the reactive power is adjusted at the receiver (e.g., by a power conversion circuit, such as output current controller 680 and active rectifier 655) based upon the load angle of the inverter.

At block 806, the wireless power transmitter system adjusts the load angle of the inverter based at least in part on a difference between the measured load angle and the reference load angle. In some embodiments, the load angle of the inverter circuit is only adjusted when the difference between the load angle and the reference angle satisfies a threshold value (e.g, indicating too much reactive power).

In some embodiments, adjusting the load angle/duty cycle of the inverter circuit triggers a change in an electrical current in the receive circuit. The amount of the adjustment selected may be selected to cause an adjustment of an amount of reactive power in the wireless power transfer system, based on changes in the power conversion circuit (e.g., output current controller 680 and active rectifier 655) that automatically occur to maintain the output power substantially constant in response to the change in the electrical current in the resonant receive circuit. For example, as discussed above, the output current controller 680 may be configured to automatically control an amount of injected reactive power (e.g., by adjusting a duty cycle of active rectifier 655) in order to maintain a substantially constant output current and output power. As such, the reactive power controller can, by changing the amount of power transmitted to the receive circuit (via adjusting the load angle/duty cycle of the inverter circuit), adjust the amount of reactive power injected into the system (e.g., lowering the reactive power in response to an indication that there is too much reactive power).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for measuring a load angle of an inverter of a wireless power transmitter may the DC/AC voltage inverter 610, the base controller 342 or a separate measuring unit. Additionally, means for comparing the measured load angle to a reference load angle may comprise the base controller 342 or the differentiator 620. Additionally, means for adjusting the load angle of the inverter based at least in part on a difference between the measured load angle and the reference load angle may comprise the base controller 342 or the reactive power controller 625.

In some aspects, wireless vehicle charging systems may require the electric vehicle being charged to be stationary, e.g., stopped near or above the wireless power transfer system such that the electric vehicle maintains presence within the wireless field generated by the wireless power transfer system for transferring charge as in the wireless power transfer system 100 of FIG. 1. Thus, while the electric vehicle is being charged by such a wireless power transfer system, the electric vehicle may not be used for transportation. Dynamic wireless power transfer systems that are capable of transferring power across free space may also implement the active tuning using reactive power described herein (e.g., FIGS. 4-8 and corresponding description). In some aspects, dynamic wireless power transfer systems may overcome some of the deficiencies of stationary wireless charging stations.

On a roadway with a dynamic wireless power transfer system comprising a plurality of the charging base pads placed linearly along a path of travel, the electric vehicle may travel near the plurality of the charging base pads while traveling on the road. Should the electric vehicle desire to charge its batteries or source energy to power the electric vehicle while traveling, in order to extend its range or reduce the need to charge later, the electric vehicle may request the dynamic wireless power transfer system activate the charging base pads along the electric vehicle's path of travel. Such dynamic charging may also serve to reduce or eliminate the need for auxiliary or supplemental motor systems in addition to the electric locomotion system of the electric vehicle 112 (e.g., a secondary gasoline engine of the hybrid/the electric vehicle 112).

Information and signals may be represented using any of a variety of different technologies and techniques. For example, data, instructions, commands, information, signals, bits, symbols, and chips that may be referenced throughout the above description may be represented by voltages, currents, magnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly transferring power via a magnetic field in a wireless power transfer system, the system including a receiver having a resonant receive circuit configured to inductively couple power via the magnetic field, a power conversion circuit of the receiver configured to adjust an amount of reactive power in the wireless power transfer system to maintain an output power substantially constant in response to changes in the power received due to variations in coupling, the apparatus comprising:
    an inverter circuit configured to output alternating electrical current;
    a resonant transmit circuit comprising a coil electrically connected to a capacitive element, the resonant transmit circuit operably coupled to the inverter circuit and configured to generate the magnetic field in response to being driven with the alternating electrical current; and
    a controller configured to:
        receive a value indicative of an electrical characteristic of the inverter circuit; and
        adjust an operating characteristic of the inverter circuit to trigger a change in an electrical current in the receive circuit, the amount of adjustment of the operating characteristic of the inverter selected by the controller to cause adjustment of an amount of reactive power in the wireless power transfer system based on changes in the power conversion circuit that automatically occur to maintain the output power substantially constant in response to the change in the electrical current in the resonant receive circuit.

2. The apparatus of claim 1, wherein the controller is further configured to determine the amount of reactive power in the wireless power transfer system based on the electrical characteristic of the inverter circuit and information regarding how the reactive power is adjusted at the receiver via the power conversion circuit based on the electrical characteristic of the inverter circuit.

3. The apparatus of claim 2, wherein the information regarding how the reactive power is adjusted at the receiver comprises a threshold limit for a duty cycle of a switching network associated with the power conversion circuit of the receiver.

4. The apparatus of claim 1, wherein the operating characteristic comprises a duty cycle of the inverter circuit.

5. The apparatus of claim 4, wherein the wherein the controller is further configured to reduce the duty cycle of the inverter circuit to reduce the electrical current in the receive circuit and to reduce the reactive power in the wireless power transfer system.

6. The apparatus of claim 1, wherein the electrical characteristic of the inverter circuit comprises a load angle of the inverter circuit.

7. The apparatus of claim 6, wherein the controller is further configured to determine the amount of reactive power in the wireless power transfer system based on a comparison of the load angle of the inverter circuit with a reference load angle.

8. The apparatus of claim 7, wherein the reference load angle is a pre-defined value or a value located in a look-up table.

9. The apparatus of claim 7, wherein the controller is further configured to adjust the load angle of the inverter circuit when the difference between the load angle of the inverter circuit and the reference load angle satisfies a threshold.

10. The apparatus of claim 6, wherein the load angle of the inverter circuit comprises an indication of a phase angle between a voltage and a current of the resonant transmit circuit.

11. The apparatus of claim 1, wherein the resonant transmit circuit is series-tuned.

12. The apparatus of claim 6, wherein the load angle comprises a difference between a time of a switching state change command of the inverter circuit and a time of a zero current crossing detection instant as detected by a current sensor.

13. The apparatus of claim 1, wherein the controller is further configured to adjust the operating characteristic of the inverter circuit based on a threshold limit for the alternating electrical current provided to the resonant transmit circuit.

14. The apparatus of claim 1, wherein the controller is further configured to adjust increase a voltage of the inverter circuit to increase the amount of reactive power in the wireless power transfer system.

15. A method for wirelessly transferring power via a magnetic field in a wireless power transfer system, the system including a receiver having a resonant receive circuit configured to inductively couple power via the magnetic field, a power conversion circuit of the receiver configured to adjust an amount of reactive power in the wireless power transfers system to maintain an output power substantially constant in response to changes in the power received due to variations in coupling, the method comprising:
outputting an alternating electric current to a wireless power transmitter;
generating, at the wireless power transmitter, the magnetic field in response to being driven with the alternating electrical current; and
receiving a value indicative of an electrical characteristic of the wireless power transmitter; and
adjusting an operating characteristic of the wireless power transmitter to trigger a change in an electrical current in the receiver, the amount of adjustment of the operating characteristic of the wireless power transmitter selected to cause adjustment of an amount of reactive power in the wireless power transfer system based on changes in the receiver that automatically occur to maintain the output power substantially constant in response to the change in the electrical current in the receiver.

16. The method of claim 15, further comprising determining the amount of reactive power in the wireless power transfer system based on the electrical characteristic of the wireless power transmitter and information regarding how the reactive power is adjusted at the receiver based on the electrical characteristic of the wireless power transmitter.

17. The method of claim 16, wherein the information regarding how the reactive power is adjusted at the receiver comprises a threshold limit for a duty cycle of a switching network associated with the power conversion circuit of the receiver.

18. The method of claim 15, wherein the operating characteristic comprises a duty cycle of the wireless power transmitter.

19. The method of claim 18, further comprising reducing the duty cycle of the wireless power transmitter to reduce the electrical current in the receive circuit and to reduce the reactive power in the wireless power transfer system.

20. The method of claim 15, wherein the electrical characteristic of the wireless power transmitter comprises a load angle of an inverter circuit of the wireless power transmitter.

21. The method of claim 20, wherein the controller is further configured to determine the amount of reactive power in the wireless power system based on a comparison of the load angle of the inverter circuit with a reference load angle.

22. The method of claim 15, wherein the controller is further configured to adjust the operating characteristic of wireless power transmitter based on a threshold limit for the alternating electrical current provided to the wireless power transmitter.

23. The method of claim 15, wherein the controller is further configured to adjust increase a voltage of wireless power transmitter to increase the amount of reactive power in the wireless power transfer system.

24. An apparatus for wirelessly transferring power via a magnetic field in a wireless power transfer system, the system including a receiver having a resonant receive circuit configured to inductively couple power via the magnetic field, a power conversion circuit of the receiver configured to adjust an amount of reactive power in the wireless power transfers system to maintain an output power substantially constant in response to changes in the power received due to variations in coupling, the apparatus comprising:
means for outputting an alternating electric current;
means for generating the magnetic field in response to being driven with the alternating electrical current; and
means for receiving a value indicative of an electrical characteristic of means for outputting the alternating electric current; and
means for adjusting an operating characteristic of the means for outputting the alternating electric current to trigger a change in an electrical current in the receiver, the amount of adjustment of the operating characteristic of means for outputting the alternating electric current selected to cause adjustment of the amount of reactive power in the wireless power transfer system based on changes in the receiver that automatically occur to maintain the output power substantially constant in response to the change in the electrical current in the receiver.

25. The apparatus of claim 24, further comprising means for determining an amount of reactive power in the wireless power transfer system based on the electrical characteristic of means for outputting the alternating electric current and information regarding how the reactive power is adjusted at the receiver based on the electrical characteristic of the means for outputting the alternating electric current.

26. The apparatus of claim 25, wherein the information regarding how the reactive power is adjusted at the receiver comprises a threshold limit for a duty cycle of a switching network associated with the power conversion circuit of the receiver.

27. A wireless power transfer system, comprising:
a wireless power receiver comprising:
  a resonant receive circuit configured to inductively couple power via a magnetic field;
  a power conversion circuit having a switching network and configured to adjust an amount of reactive power in the wireless power transfers system in response to adjusting states of the switching network to maintain an output power substantially constant in response to changes in the power received due to variations in coupling; and
a wireless power transmitter comprising:
  an inverter circuit configured to output alternating electrical current;
  a resonant transmit circuit comprising a coil electrically connected to a capacitive element, the resonant transmit circuit operably coupled to the inverter circuit and configured to generate the magnetic field in response to being driven with the alternating electrical current; and
  a controller configured to:
    receive a value indicative of an electrical characteristic of the inverter circuit; and
    adjust an operating characteristic of the inverter circuit to trigger a change in an electrical current in the receive circuit, the amount of adjustment of the operating characteristic of the inverter selected by the controller to cause adjustment of the amount of reactive power in the wireless power transfer system based on changes in the power conversion circuit that automatically occur to maintain the output power substantially constant in response to the change in the electrical current in the resonant receive circuit.

28. The wireless power transfer system of claim 27, wherein the controller is further configured to determine the amount of reactive power in the wireless power transfer system based on the electrical characteristic of the inverter circuit and information regarding how the reactive power is adjusted at the receiver via the power conversion circuit based on the electrical characteristic of the inverter circuit.

29. The wireless power transfer system of claim 27, wherein the information regarding how the reactive power is adjusted at the receiver comprises a threshold limit for a duty cycle of the switching network.

30. The wireless power transfer system of claim 27, wherein the operating characteristic comprises a duty cycle of the inverter circuit.

* * * * *